United States Patent [19]

Knapp

[11] 4,344,556
[45] Aug. 17, 1982

[54] WELDING BACKUP TAPE AND ITS METHOD OF MANUFACTURE

[76] Inventor: Donald K. Knapp, 16802 SE. 28th St., Bellevue, Wash. 98008

[21] Appl. No.: 280,834

[22] Filed: Jul. 6, 1981

Related U.S. Application Data

[63] Continuation of Ser. No. 43,311, May 29, 1979, abandoned.

[51] Int. Cl.$^3$ .......................... B23K 5/22; B23K 9/02; C09J 7/02
[52] U.S. Cl. ........................................ 228/50; 156/89; 164/72; 164/138; 219/160; 228/216; 428/40; 428/354
[58] Field of Search .................... 228/50, 216; 164/72, 164/138; 156/89; 219/160; 428/40, 354

[56] References Cited

U.S. PATENT DOCUMENTS

| | | |
|---|---|---|
| 2,792,626 | 5/1957 | Chyle . |
| 3,326,741 | 6/1967 | Olson . |
| 3,365,566 | 1/1968 | Kuder . |
| 3,372,852 | 3/1968 | Cornell . |
| 3,396,935 | 8/1968 | Snyder . |
| 3,490,065 | 1/1978 | Shannon et al. . |
| 3,494,020 | 2/1970 | Cornell . |
| 3,508,938 | 4/1970 | Jones . |
| 3,509,936 | 5/1970 | Kearfoth et al. . |
| 3,850,684 | 11/1974 | Gamble . |
| 3,929,270 | 12/1975 | Keith . |
| 3,972,466 | 8/1976 | Keith . |

Primary Examiner—James C. Cannon
Attorney, Agent, or Firm—Roy E. Mattern, Jr.

[57] ABSTRACT

In welding metal sheets together from only one side, an improved welding backup tape is self-adhesively applied to insure the consistent formation of a smooth, inclusion free, slightly convex underbead which requires little or no dressing, or grinding, and which does not impede in any way the achievement of 100% radiographic weldment testing. This welding backup tape is made in one embodiment by mixing into solution two parts of a colloidal silica solution with one part of a titanium dioxide refractory coating solution. Applying this resulting solution as a refractory coating to the upper portion of an electrical grade, heat treated, braided, natural finish, finely woven, fiberglass material in a sleeving configuration. Heating this solution soaked fiberglass sleeving at or above seven-hundred and below one-thousand degrees fahrenheit to activate its binding capability, to burn off all the organic matter from both the fiberglass sleeving and the refractory coating, and to remove all mechanical and chemical water. Bringing together from supply sources, this refractory coated fiberglass sleeve, a silicone adhesive coated electrical grade fiberglass carrier tape, and a transfer material such as a thin, three to six mil, polyethylene film. Pressing the fiberglass sleeving, coated side up, down upon the center of the fiberglass carrier tape, adhesive side up. Pressing the transfer material, e.g. the polyethylene film, down on both the coated fiberglass sleeving and the fiberglass carrier tape to affix itself to the exposed adhesive of the carrier tape at either side of the affixed coated sleeving.

8 Claims, 3 Drawing Figures

WELDING BACKUP TAPE AND ITS METHOD OF MANUFACTURE

This is a continuation of application Ser. No. 43,311, filed May 29, 1979, now abandoned.

BACKGROUND OF INVENTION

In welding metal sheets together from only one side, originally, metal backup bars were used which had inherent limitations in certain situations, as stated by John Cresap, in 1962 or 1963 in his article entitled, Fiber-Glass Tape for Backing Up Welds, refer to NASA Bulletin SP501F. To overcome these limitations, he described how fiberglass tape was being tested as a substitute for metal backup bars. However, as early as 1944, U.S. patent disclosures describe how previous inventors have provided various improved backup materials in lieu of metal backup bars. Some of these disclosures are as follows:

In 1944, E. A. Smith in his U.S. Pat. No. 2,362,505 set forth an improved backing strip, used during welding, combining a flexible refractory material and a flexible metallic support to carry the refractory material. In 1958, Messrs, Chyle and Zimmermann in their U.S. Pat. No. 2,820,427 provided a welding backup assembly of a tape made of fibrous glass fabric impregnated with a thermo-plastic, pressure sensitive adhesive. Also Messrs. Chyle and Zimmermann in 1959 in their U.S. Pat. No. 2,916,001 provided a welding backup strip comprising a thin layer of ceramic or refractory insulating material extruded or otherwise applied to a wire mesh or lattice.

Messrs. Hackman and O'Brien in 1961 in their U.S. Pat. No. 3,001,057 in respect to sigma spot welding used a backing strip of glass or silica having its own heat resistant adhesive. In 1965, Messrs Duffy and Flannagan in their U.S. Pat. No. 3,192,357 used a combination of an immediate fiberglass tape to be adjacent the weld to be made, and this tape in turn is backed up by a reinforced strip of bonded flex materials. In 1968, Mr. Cornell in his U.S. Pat. No. 3,372,852 described his welding backing tape composed of refractory material in a bonded strip secured with a heat resistive adhesive, to a glass fabric strip. In 1968, Mr. Kuder in his U.S. Pat. No. 3,365,566 described a backup tape, used during welding, comprised of glass cloth with an adhesive to secure along the center a thin layer of metal or foil and also to secure the tape to the bottom piece of metal to be welded to another piece of metal.

In 1970, Mr. Cornell in his U.S. Pat. No. 3,494,020 described a welding backup tape having a backing made of glass fabric, metal foil, paper, cotton, nylon, rayon, treated with a flame retardant composition, and a centered strip of refractory material containing a carbon scavenger, and including an adhesive. In 1975, Mr. Keith, in his U.S. Pat. No. 3,929,270 describes a welding backup tape having a strip of flexible refractory material centered on tape backing of glass cloth, metal foil or the like having a pressure sensitive adhesive, and this preassembly is improved by adding a tacky layer of film-forming adhesive, covered in turn by a monolayer of inorganic particles. In 1976, in another of his patents, U.S. Pat. No. 3,972,466, Mr. Keith discloses an improved high temperature welding backup strip. On a woven carbon cloth, having a pressure sensitive adhesive, a refractory layer of glass cloth is centered to form the first embodiment of his backup strip. In another embodiment, refractory particles are included of aluminum oxide, glass, and mixtures thereof bonded together.

Then in 1977 Messrs. Roden and Criger in their U.S. Pat. No. 4,049,183 described their use of a heavy wall, flexible, woven refractory fiber tube placed within a slightly larger diameter similar tube with both tubes being partially flattened against an adhesive coated surface of a wider, heat resistant strip to complete their welding backup tape. It is understood, more recently Messrs Roden and Criger have created the equivalent of their tube in another way.

Later in 1977, the applicant developed an improved welding backup tape having a carrier tape or carrier, which did not have any aluminized backing, or the like, which, otherwise, would have trapped gases liberated from adhesives and other materials during welding to possibly create voids in the welds, and which, in reference to the two concentric tubes, i.e. sleeves, used by Messrs. Roden and Criger, provided an outer tube or sleeve made of finely woven fiberglass, to create a back weld surface, which was smooth enough not to interfere with otherwise obtaining a 100% X ray testing of the weld, then having only a minimum pattern imparted to the weld surface by the finely woven fiberglass of the outer tube or sleeve. However, the finely woven fiberglass tube or sleeve, although in many instances resulting in a 100% X ray test result, did in other instances, because of its thinness, split apart and/or burn, often yielding tramp fiberglass splinters, i.e. shards, to the resulting weldment as unwanted inclusions. Therefore efforts were continued to create a better welding backup tape.

SUMMARY OF THE INVENTION

Although the prior developments of welding backup tapes improved upon preceding ones, as they no longer trapped gases liberated from adhesives and other materials used, which would otherwise cause unwanted voids in the welds, and they no longer produced a surface pattern on the back side of the weld which would interfere with obtaining a 100% X ray testing of the welded joint, yet they did on occasions split apart and/or burn, creating unwanted inclusions in the weldments. Therefore there remained a need for improved welding backup tapes. Now the applicant provides an improved welding backup tape which continues to fulfill the early requirements of no gas generation that would cause voids, and no surface patterns in the back weld surface to interfere with 100% X ray testing, and which, in addition: is usable when welding thin plates or sheets together without being self-destructed by splitting, burning, etc. as it becomes overheated; continues to improve the back weld surface by eliminating any departures to become unwanted inclusions in the weld; creates a slightly convex underbead of the back weld, which thereafter requires little or no dressing or grinding, and consequently does not impede in any way the achievement of 100% radiographic weldment testing; and which may be manufactured into some embodiments using a method involving steps undertaken continuously so many of the starting materials may be taken from reel supply sources and the completed improved welding backup tape may be stored and transported on reels.

The applicant's improved welding backup tape, returns to the use of a stronger, thicker, more coarsely woven fiberglass material often in a sleeving or equivalent configuration, on which a refractory coating is applied, where contact is to be made with the weldment. This refractory coating closes the weave voids for creating a smoother pattern in a resulting surface of a weldment, i.e. reduces the transfer of the weave pattern of the woven fiberglass sleeving; increases the refractoriness of the backup tape, thus resisting the molten aluminum, i.e. metal, during welding; reduces and/or eliminates inclusions of backup tape materials in the weldment by stabilizing the surface of the backup tape, i.e. essentially no tramp inclusions are yielded to the weld; presents to the weld a chemically non-reactive surface on the backup tape; and keeps silicates, otherwise located in the backup tape, from the weldment. This improved welding backup tape in one embodiment is made as stated in the abstract of the disclosure.

DESCRIPTION OF THE DRAWINGS

Embodiments of the welding backup tape having a refractory coating are illustrated in the accompanying drawing, inclusive of a schematic illustration of the manufacture, wherein.

DESCRIPTION OF THE INVENTION

Figure 1:
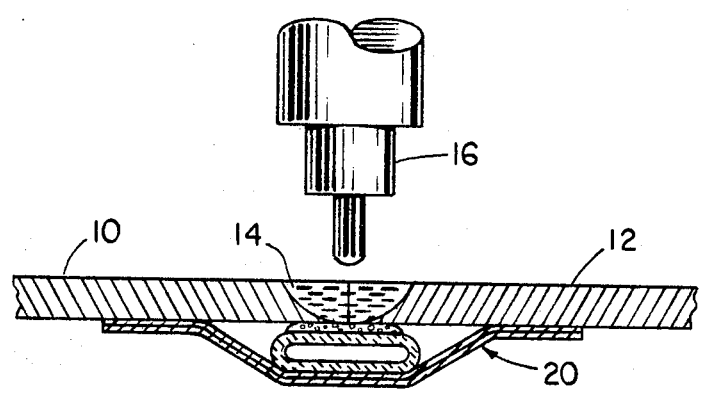
FIG. 1 is a schematic cross section through the welding backup tape and aluminum sheets as they are being welded together.
Figure 2:
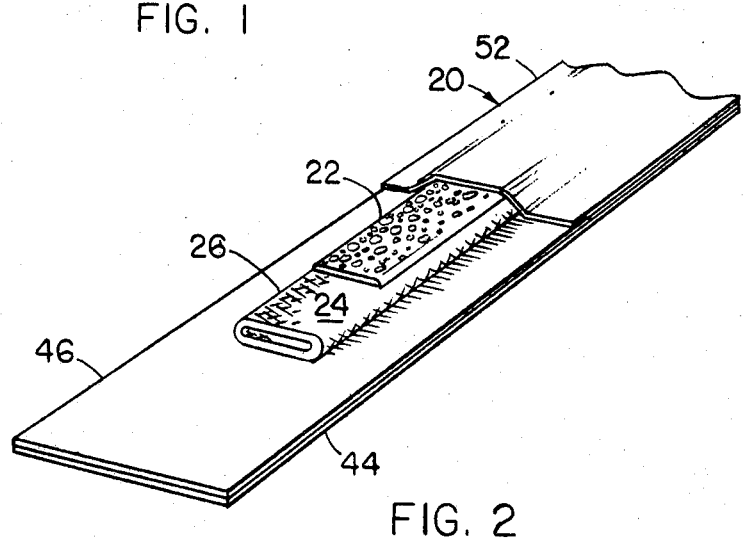
FIG. 2 is an end perspective view of the welding backup tape, with portions removed to further illustrate the interpositioning of the various components.

As illustrated in FIG. 1, in welding metal sheets 10 and 12 together via a weldment 14 using welding equipment indicated by the welding head 16, an improved welding backup tape 20 is used. The various components of this improved welding backup tape 20 are further illustrated in FIG. 2. It is self-adhesively applied to the underside of the metal sheets, i.e. aluminum sheets as illustrated in FIG. 1, to insure the consistent formation of a smooth inclusion free, slightly convex underbead, which requires little or no dressing, or grinding, and which does not impede in any way the achievement of 100% radiographic weldment testing.

Figure 3:
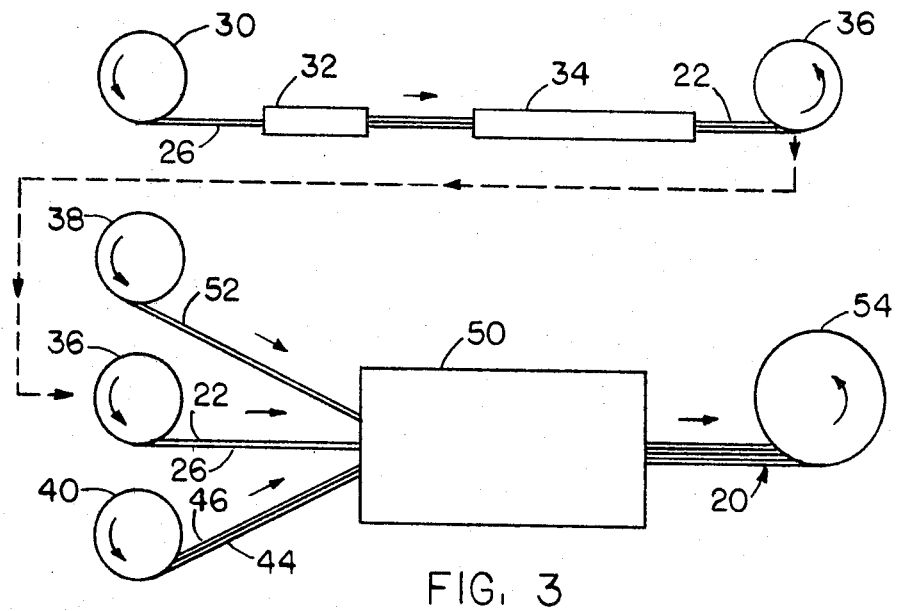
FIG. 3 is a schematic diagram illustrating how the welding backup tape is made with respect to one manufacturing embodiment.

This improved welding backup tape 20 is made in one embodiment by mixing into solution two parts of a colloidal silica solution, such as a presently available du Pont's Ludux HS30 30% colloidal silica and 70% water, with one part of a titanium dioxide and binder refractory coating solution, such as Thermium Inc's., $T_1O_2$, i.e. Thermium 7410, coating. Then, as illustrated in FIG. 3, this resulting refractory solution is applied as a refractory coating 22 to the upper portion 24 of an electrical grade, heat treated, braided, natural finish, finely woven fiberglass material 26 in a sleeve configuration. After its application, the refractory solution soaked fiberglass sleeving 26, is heated at or above seven-hundred degrees and preferably below one-thousand degrees, avoiding devitrification of the fiberglass material, to activate the refractory solution's binding capability, to burn off all the organic matter from both the fiberglass sleeving 26 and the refractory coating 22, and to remove all mechanical and chemical water.

Then as further illustrated in FIG. 3, the fiberglass sleeving 26 taken from reel 30, coated in coating unit 32, and heated in heater 34, and rewound on reel 36, is transported on its reel 36, as indicated by the dotted line and placed between reel 38, above, from which a transfer material 52 such as a thin, three to six mil, polyethylene film is unreeled, and reel 40 below, from which a silicone adhesive coated electrical grade fiberglass carrier tape 44, such as Permacel 212 tape, is unreeled. The fiberglass sleeving 26, with its refractory coating 22 on its upper portion 24 is pressed down on the center of the fiberglass carrier tape 44, which has its adhesive coating 46 on top, after the sleeving 26 and carrier tape 44 enter the combined guiding and pressing unit 50. Soon thereafter in unit 50, the transfer material 52, i.e. the polyethylene film, i.e. cover sheet 52, is guided and pressed down on both the refractory coated, 22, fiberglass sleeving 26 and the fiberglass carrier tape 44 to affix the transfer material 52, i.e. the cover 52, to the exposed adhesive coating 46 on the fiberglass carrier tape 44 along both sides of the affixed refractory coated 22 fiberglass sleeving 26. Thereafter, the improved covered welding backup tape 20 is wound on reel 54 for storage, transport, and eventual use in welding operations; upon stripping off the transfer material 52, i.e. cover of polyethylene, and using the adhesive coating 46 to adhere this improved backup tape 20 to the back side of the metal sheets 10 and 12, to be joined, with the refractory coating 22 and the fiberglass sleeving 26 centered along the edges of the metal sheets, where the weldment 14 will be formed.

The refractory coating 22, when it is applied, closes the weave voids of fiberglass sleeving 26, or equivalent material, creating, during welding, a smoother pattern in a resulting surface of a weldment 14, i.e. reduces the transfer of the weave pattern of the woven fiberglass sleeving 26; increases the refractoriness of the backup tape 20, thus resisting the molten metal, i.e. molten aluminum in respect to the illustrated embodiment, during welding; reduces and/or eliminates inclusions of the backup tape materials in the weldment 14, by stabilizing the surface of the backup tape 20, i.e. essentially no tramp inclusions are yielded to the weldment 14; presents to the weldment 14 a chemically nonreactive surface on the backup tape; and keeps silicates, otherwise located in the backup tape 20, from the weldment.

In respect to other embodiments, the compounds used in the refractory coating materials and in their binding systems must be compatible with each other and also be suitable to the welding operations, i.e. the metals being welded. The other refractory materials which are considered for their compatibility and designated by their names, either common or scientific, are: alumina, aluminum oxide, $Al_2O_3$, zirconium silicate, zircon, zirconium dioxide, zirconia, magnesia, MgO, boria, titanium dioxide, titania, silica, chromia, chromic oxide.

The other binding systems, i.e. binding materials, which are considered for their compatibility and designated by their names, either common or scientific, are: colloidal alumina, phosphoric acid, ethyl silicate, sodium silicate, potassium silicate, chromic oxide.

I claim:
1. A welding backup tape, comprising:
   (a) a heat treated, braided, substantially finely woven fiberglass material of sleeve like cross section having a high temperature fired on refractory coating on its upper portion, freed of all matter which would otherwise later cause outgasing, which is derived from mixing solutions of two parts of colloidal silica solution and one part of a titanium dioxide refractory coating;

(b) a silicone adhesive coated fiberglass carrier tape positioned below and centered against the lower portion of the refractory coated fiberglass material; and (c) a thin polyethylene film release material ranging in thickness from 3 to 6 mils pressed down over the coated fiberglass material and into adhesive contact with the said fiberglass carrier tape.

2. A welding backup tape comprising:

(a) a heat treated, braided, substantially finely woven fiberglass material or tubular cross section having a fired on coating, fired at a temperature between 700 and 1000 degrees Fahrenheit, on its upper portion derived from a two part colloidal binding solution and a one part refractory coating solution, wherein compatible materials are selected from among the binding group of silica colloidal solution, alumina colloidal solution, ethyl silicate solution, sodium silicate solution, potassium silicate solution, phosphoric acid solution, chromic acid solution, and from among the refractory group of alumina, zirconia, zircon, magnesia, silica, chromia, titania, boria, or combinations thereof;

(b) a silicone adhesive coated fiberglass carrier tape positioned below and centered against the lower portion of the coated fiberglass material; and (c) a release material pressed down over the coated fiberglass material and into adhesive contact with the said fiberglass carrier tape.

3. A method of manufacturing a welding backup tape, comprising:

(a) mixing into solution a colloidal silica solution with a titanium dioxide refractory coating solution;

(b) applying this resulting solution as a coating to the upper portion of a heat treated, braided, finely woven fiberglass material;

(c) heating this coated fiberglass material at a sufficiently high temperature to activate its binding capability, to burn off all its organic matter from both the fiberglass material and coating, and to remove all water;

(d) bringing together from respective supply sources, this coated fiberglass material, a silicone adhesive coated fiberglass carrier tape, and a release material;

(e) pressing the fiberglass material, coated side up, down upon the center of the carrier tape, adhesive side up; and (f) pressing the release material down on both the coated fiberglass material and the carrier tape, to affix itself to the exposed adhesive of the carrier tape at either side of the affixed fiberglass material.

4. A method of manufacturing a welding backup tape, as claimed in claim 3, wherein the heating of the coated fiberglass material is undertaken at or above 700° F. and not over 1000° F.

5. A method of manufacturing a welding backup tape, as claimed in claims 3 or 4, wherein the fiberglass material has a sleeve like cross section.

6. A method of manufacturing a welding backup tape, as claimed in claims 3 or 4 wherein the release material is a thin polyethylene film taken from sources ranging in thickness from three to six mils.

7. A method of manufacturing a welding backup tape as claimed in claims 3 or 4, wherein in mixing the solutions, two parts of the colloidal silica solution are mixed with one part of the titanium dioxide refractory coating solution.

8. A method of manufacturing a welding backup tape; comprising:

(a) mixing into solution two parts of compatible binding materials and one part of refractory materials to make a refractory coating solution, the binding materials being selected from among the group of silica colloidal solution, alumina colloidal solution, ethyl silicate solution, sodium silicate solution, potassium silicate solution, phosphoric acid solution, chromic acid solution, and the refractory materials being selected from among the group of alumina, zirconia, zircon, magnesia, silica, chromia, titania. boria, or combinations thereof;

(b) applying this resulting solution as a coating to the upper portion of a heat treated, braided, finely woven fiberglass material of tubular cross section;

(c) heating this coated fiberglass material at a sufficiently high temperature between 700 and 1000 degrees Fahrenheit to activate its binding capability, to burn off all its organic matter from both the fiberglass material and coating, and to remove all water so there will be no gasing attributed to the welding tape during welding;

(d) bringing together from respective supply sources, this coated fiberglass material, a silicone adhesive coated electrical grade fiberglass carrier tape, and a release material;

(e) pressing the fiberglass material, coated side up, down upon the center of the carrier tape, adhesive side up; and (f) pressing the release material down on both the coated fiberglass material and the carrier tape, to affix itself to the exposed adhesive of the carrier tape at either side of the affixed fiberglass material.

* * * * *